Figure 3:
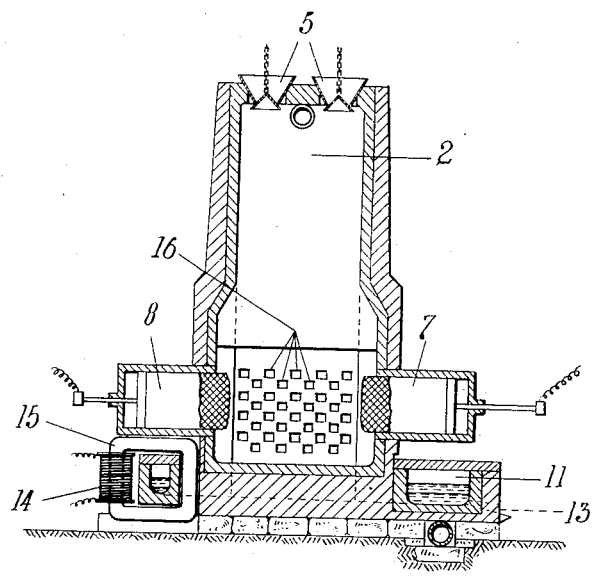

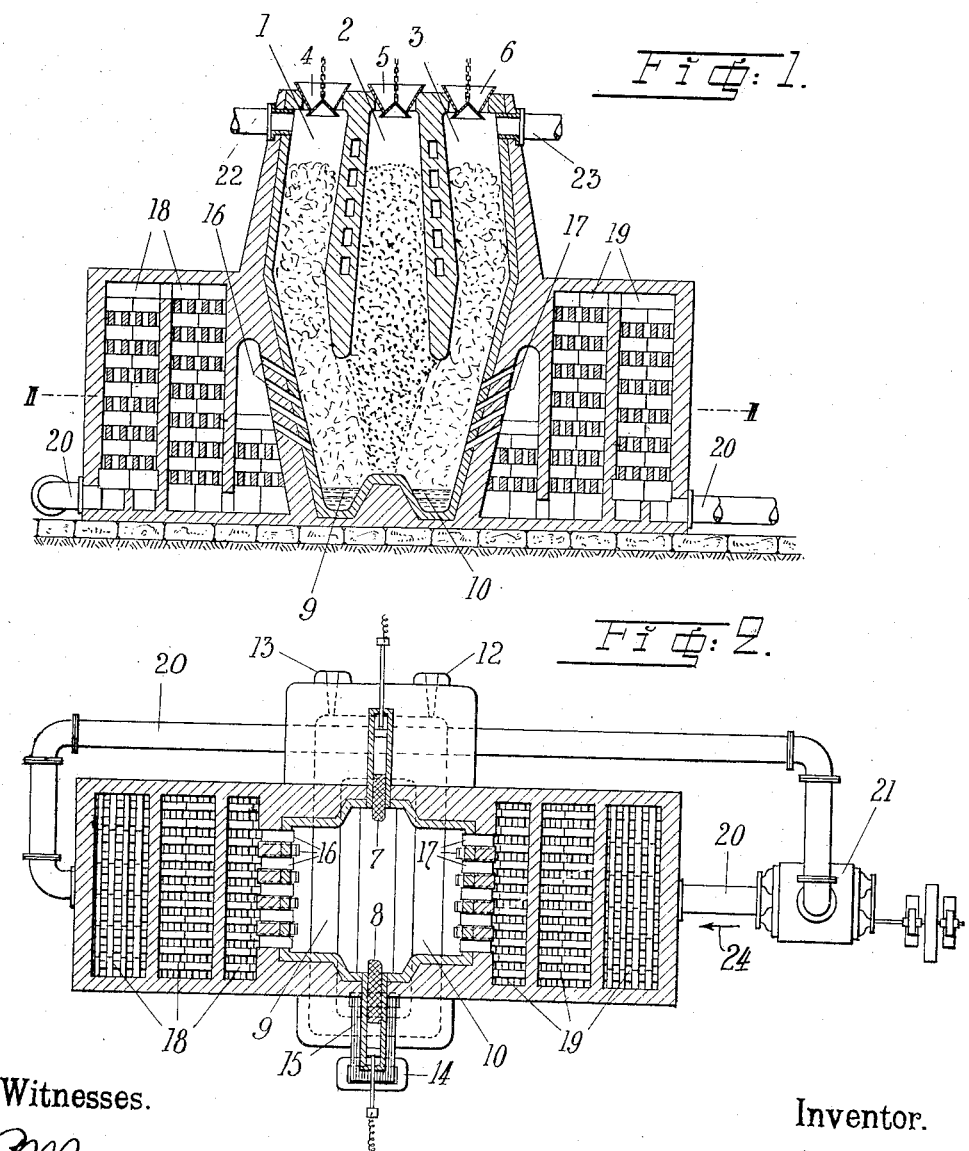

No. 858,621. PATENTED JULY 2, 1907.
A. J. PETERSSON.
PROCESS OF ELECTRICALLY REDUCING OXID ORES.
APPLICATION FILED OCT. 30, 1906.

2 SHEETS—SHEET 2.

Witnesses.
B. Dommers
Jesse N. Lutton

Inventor.
Albert Johan Petersson
by Henry Orth Jr.
Atty.

UNITED STATES PATENT OFFICE.

ALBERT JOHAN PETERSSON, OF ALBY, SWEDEN.

PROCESS OF ELECTRICALLY REDUCING OXID ORES.

No. 858,621.　　　　　Specification of Letters Patent.　　　　Patented July 2, 1907.

Application filed October 30, 1906. Serial No. 341,342.

*To all whom it may concern:*

Be it known that I, ALBERT JOHAN PETERSSON, a subject of the King of Sweden, and a resident of Alby, Sweden, have invented certain new and useful Improvements in Processes of Electrically Reducing Oxid Ores and the Like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a processs of electrically reducing oxid ores, or the like ores, and other oxids or combinations of oxids while using as reducing agent carbon or carbonic oxid obtained from the carbon of the charge.

The object of the invention is to render it possible to carry out the reduction processes continually and at a very high heating effect of the electric current.

In my Swedish Letters Patent No. 11862 of 1900 I have described a process of producing in the electric way reducing gases, especially carbonic oxid, and the use of such gases for carrying out metallurgical reduction processes in separate furnaces. The carrying out of the said process is, however, connected with special difficulties as soon as a high temperature is required for the reduction, in as much as it is impossible by means of the gas produced in accordance with the said process to obtain an intense heat depending on the small heat capacity of the gas and on the losses of heat caused by the metallurgical process and the production of gas being carried out in separate furnaces.

Further, it has been proposed to carry out metallurgical processes in such a manner that the material to be treated and carbon are introduced in one and the same furnace in separate layers, the material to be reduced being directly subjected to the action of an electric arc or forming a resistance in an electric circuit, while carbonic oxid or other reducing gases are brought to circulate through the furnace. In such method the material to be reduced thus will be heated to a higher temperature than the adjacent layers of carbon, and the method, therefore, in the most cases cannot be used for the reduction of such ores and the like, as are reduced at a lower temperature than carbonic acid in as much as the temperature on account of heat being bound in the reduction of the ore, or the like, tends to keep itself at the amount which corresponds to the temperature of reduction of the material so that the adjacent layers of carbon will obtain a lower temperature than would be required for the reduction of the carbonic acid which is formed in the reduction of the ore, or the like. Moreover, the electrodes will in an essential degree partake in the reduction so that they will rapidly be consumed and thereby make the product more expensive than otherwise.

The present invention relates to a process of reducing and melting whereby it will be possible to utilize in an economical manner the heat developed by the electric current and at the same time to obtain a small consumption of the electrodes and an effective regeneration of the gases of carbonic oxid used for the performance of the process independently of the reduction temperature of the material which is treated.

The invention consists, principally, in charging the ore, or the like, and the carbon into one and the same electric furnace but in separate layers which are in direct contact with each other, and leading the electric current through the layer or layers of carbon. In this method the carbon will be more intensely heated than the other part of the charge and may without difficulty be heated to such a high temperature as is required for an effective reduction of carbonic acid into carbonic oxid, while simultaneously the electrodes, through which the electric current is introduced into the charge, may be effectively prevented from being consumed. Moreover, the transfer of heat from the carbon to the other part of the charge on account of direct conduction and by means of circulating gases will be obtained sufficiently great for the performance of the process, losses of heat and greater falls of temperature being eliminated on account of the parts of the charge being in close proximity to each other. The reduced metal will at least partially melt by the influence of the intense heat of the transition layers between the carbon and the ore when the latter are in direct contact with each other, and is accumulated in a suitable reservoir in the bottom of the furnace, and the said melting action may eventually be sustained by inducting in the melted mass secondary currents by means of suitable transformer devices.

The inventon will be more particularly described herebelow with reference to the accompanying drawings illustrating diagrammatically a furnace-plant for carrying out the process.

Figure 1 shows a vertical longitudinal section of the furnace. Fig. 2 shows a horizontal section on line II—II in Fig. 1, and Fig. 3 shows a central vertical section of the furnace.

Referring to the drawing, the furnace shown has three shafts 1, 2 and 3 being at the top provided with suitable throats 4, 5 and 6 respectively. The shafts 1 and 3 are adapted to be charged with ore or the like, while the shaft 2 is charged with coal, anthracite or the like herebelow referred to as carbon. The lower parts of the shafts are in open communication with each other but nevertheless the carbon and the ore, or the like, also here form substantially separate layers or columns, the columns of ore closely surrounding the column of carbon. The lastmentioned part of the furnace constitutes the reduction- and melting-zone proper.

For introducing the electric current into the furnace electrodes 7 and 8 are inserted in the lower parts of the walls of the furnace at such places that the column of carbon will come into contact with the same, while the said electrodes not at all or only in little degree will come in contact with non-reduced ore or with the gases which in the manner described herebelow are brought to circulate through the furnace, the electrodes on account thereof being effectively prevented from being consumed. At the bottom of the furnace two reservoirs 9 and 10 are provided, which at the one end may be in communication with a receiver 11 provided at different heights with outlets 12 and 13 for the slag and the melted metal respectively. At the other end the said reservoirs 9 and 10 may be connected to each other and inclose a transformer core 15 having a suitable secondary coil 14, whereby strong secondary currents may be induced in the melting bath in order to facilitate the melting of the reduced metal.

In the side-walls of the reduction- and melting-zone of the furnace are provided a number of channels 16 and 17 communicating with regenerators 18 and 19 respectively on each side of the furnace. The outer ends of the said regenerators are by means of a pipe 20 and a ventilator or the like 21 connected to each other, so that the same together with the lower part of the furnace chamber constitute a closed circulation system. At the top the shafts 1 and 3 are provided with outlets 22 and 23 respectively for the excess of gases generated in the system.

The furnace plant described above works as follows: When the furnace has been charged about to the height indicated in Fig. 1, the lower part of the carbon column is heated to incandescence by leading an electric current through the electrodes 7 and 8 and the intermediate part of the column of carbon. Hereby also the adjacent portions of the charge of ore will obviously be heated to a high temperature. When the required temperature has been obtained in the lower part of the furnace, the ventilator 21 is put in operation, for instance in such a direction that the gases in the system are brought to circulate in the direction of the arrows 24. The said gases consist in the starting substantially of air which when circulated effects a burning of a part of the carbon into carbonic oxid, and at the same time the said air is intensely heated when passing through the column of carbon. The carbonic oxid effects the reduction of a part of the ore below the shaft 1 during formation of carbonic acid which dilutes the circulating gas-mixture. The latter will thereupon enter the regenerator 18 through the channels 16 and delivers there the main part of its heat, so that the gas-mixture will pass the pipe 20 and the ventilator 21 in a comparatively cold condition, whereby losses of heat and injuries on the ventilator otherwise caused by a too strong heating of the same will be obviated. The gases thereupon flow through the regenerator 19, the channels 17 and the column of ore below the shaft 3, whereupon they will again pass through the glowing column of carbon below the shaft 2 where they will be reheated and the carbonic acid contained in the gas-mixture will be converted into carbonic oxid by taking up carbon from the column of carbon. When the gases come into the column of ore below the shaft 1 they are thus again capable of reducing another quantity of ore while consuming a part of the carbonic oxid which by the oxygen of the ore is converted into carbonic acid. In such manner the circulation will go on continually, and the result will be that the gas inclosed in the system is successively converted into carbonic oxid formed by the carbon of the charge and the oxygen of the ore, the excess of gas flowing off through the shafts 1 and 3 and the outlets 22 and 23. When the main-part of the circulating gas has been converted into carbonic oxid, the reaction takes place fully effectively during a continuous oxidizing of the carbonic oxid in the column of ore and a subsequent reduction of the carbonic acid formed in the column of carbon. Simultaneously heat is transferred by the circulating gas to the column of ore below the shaft 1 and to the regenerator 18 which absorbs the remaining heat of the gas. By the said transfer of heat and by direct conduction of heat from the glowing column of carbon the reduced metal will melt and drop down into the reservoir 9.

When the desired quantity of heat has been stored up in the regenerator 18, the ventilator 21 is reversed so that the gas will circulate from the ventilator through the pipe 20, the regenerator 18, the channels 16, the column of ore below the shaft 1, the column of carbon below the shaft 2, the column of ore below the shaft 3, the channels 17, and the regenerator 19 back to the ventilator 21, and so on. The carbonic oxid mixed with carbonic acid absorbs heat in the regenerator 18 when passing therethrough and being heated to a comparatively high degree passes through the partially reduced column of ore below the shaft 1 and thus does not in any essential degree cool the same. When passing through the glowing column of carbon the carbonic acid of the mass of gas is reduced and the whole quantity of gas intensely heated, so that the same while passing through the column of ore below the shaft 3 is capable of effectively reducing the said ore. The heat contained in the gas after the passage through the lastmentioned column of ore will be stored up in the regenerator 19, so that the gases circulating through the ventilator and the other outer parts of the circulation system are comparatively cold.

When the regenerator 19 has been sufficiently heated and the regenerator 18 sufficiently cooled, the direction of circulation of the gases is again reversed, and the same may thereupon be reversed as often as is required with respect to the heating or cooling of the regenerators or as often as is suitable for the performance of the process. Eventually the reversal of the direction of flow of the gases may be made at so short intervals that the mass of gas partaking in the reaction will chiefly, oscillate between the column of carbon and the columns of ore on each side thereof. The central column of carbon is continually heated by the electric current passing therethrough, the said current thus delivering the heat required for the re-reduction of the carbonic acid, formed in the reduction of the ore, into carbonic oxid, and the heat required for heating the ore and the partial or full melting of the reduced metal. The object of the regenerators is to prevent losses of heat otherwise caused by the heat being moved by means of the circulating gases, the gas in the above described arrangement of the furnace being at a comparatively high temperature when leaving the channels 16 and 17 respectively.

In order to accelerate the melting of the reduced metal the transformer 14, 15 may be put in operation, whereby in the secondary conductor formed by the melting mass will be induced a strong current heating the melting bath which thereby will be capable of delivering heat to the adjacent reduced parts of the charge. Eventually the circulation of gas may be led through the shafts 1 and 3 whereby the ore in the latter will be preliminary heated and serve as heat storage so that the size of the regenerators may be essentially reduced, or at sufficiently high shafts be dispensed with.

In order to accelerate the starting of the process the one or both of the regenerators may be previously heated, and eventually the whole furnace system may be filled with carbonic oxid, before the working is commenced.

In the drawing I have shown double columns of ore and one regenerator at each side of the furnace. In some cases it may, however, be sufficient to use only one column of ore, in which case the direction of circulation of the gas obviously should be kept constant. In order to carry back to the furnace the heat which is moved on account of the circulation of the gases one may in such case use two regenerators which may alternately be connected to the furnace before or after the same counted in the direction of circulation, while the ventilator or any other circulation device is arranged between the outer ends of the regenerators relative to the furnace. In large furnace plants any number of columns of charge may be used, of which every other is a column of ore and every other a column of carbon.

When volatile ores, such as zinc, are to be reduced, a column of carbon may suitably be arranged on each side of a column of ore. The mixture of metal vapor and carbonic acid formed in the reduction of the ore will hereby always, independently of the direction of circulation, pass through a column of carbon heated to incandescence by the electric current, wherby the carbonic acid will be fully reduced into carbonic oxid, so that the gas-mixture leaving the reduction chamber will, chiefly, contain only metal vapor and carbonic oxid. The metal vapor, therefore, may easily be condensed outside the furnace and accumulated in a suitable reservoir without running the risk of being re-oxidized, while the carbonic oxid may be separated and brought to again partake in the circulation.

In some cases the walls between the columns of the charge may, in order to prevent the electric current from taking its way in any essential degree through the columns of ore be extended to the bottom of the furnace and be provided with channels for letting through the gases, whereby the direct contact between the columns of the charge will be prevented. In such case the column or columns of carbon serve chiefly to heat the circulating gases to a high temperature and to convert the carbonic acid into carbonic oxid. The ore in the said case will be heated chiefly by the circulating gas but generally a special supply of heat to the reduced ore will be necessary in order to melt the same. The said supply of heat may be obtained either by using the column of ore as resistance between electrodes of a primary electric circuit, or by using the melted mass as secondary member of a transformer.

The above described invention may advantageously be used also for the production of siliceous iron by melting by means of carbon old broken iron or ore and silicic acid or highly siliceous ores respectively. In such case the carbon is charged so as to form a column or layer between the electrodes and to protect the same from being consumed, the said column of carbon being heated by means of the electric current to such a high temperature that it will reduce and melt the other part of the charge. Furnaces may be used of the kind employed for the production of carbid and which have a furnace chamber in the shape of a crucible and an electrode at the bottom and an upper, central electrode, so that the circulation of gases as well as the heating of the melting bath by means of induced currents may be dispensed with.

Having now described my invention, what I claim as new and desire to secure by Letters Patent is:

1. The process of reducing oxid ores and the like by means of carbon, which consists in successively charging the ore and the carbon into an electric furnace so that ore and carbon continuously form separate upright columns in close contact with each other, and heating the column of carbon by means of electric currents to a reactive temperature to reduce the ore, substantially as and for the purpose set forth.

2. The process of reducing oxid ores and the like by means of carbon, which consists in successively charging the ore and the carbon into an electric furnace so that ore and carbon continuously form separate upright columns in close contact with each other, heating the column of carbon by means of electric currents to a reactive temperature, facilitating the reduction of the ore by circulating hot reducing gases from the column of carbon to the column of ore, and regenerating said reducing gases by returning them to the column of carbon, substantially as and for the purpose set forth.

3. The process of reducing oxid ores and the like by means of carbon, which consists in successively charging the ore and the carbon into an electric furnace so that ore and carbon continuously form separate upright columns in close contact with each other, heating the column of carbon by means of electric currents to a reactive temperature, and facilitating the melting of the reduced metal by inducing electric currents in the melted metal, substantially as and for the purpose set forth.

4. The process of reducing oxid ores and the like by means of carbon, which consists in successively charging the ore and the carbon into an electric furnace so that ore and carbon continuously form separate upright columns in close contact with each other, heating the column of carbon by means of electric currents to a reactive temperature, accelerating the reduction of the ore by circulating hot reducing gases from the column of carbon through the column of ore, storing the heat carried away from the charge by the circulating gases, pre-heating said gases by means of heat previously stored up, and regenerating said reducing gases by returning them to the column of carbon, substantially as and for the purpose set forth.

5. The process of reducing ores and the like which comprises introducing the ore and the carbon in separate contacting columns into an electric furnace, passing an electric current through the column of carbon and burning the combustible gases at or about the zone of reduction of the ore.

In testimony that I claim the foregoing as my invention, I have signed my name in presence of two subscribing witnesses.

ALBERT JOHAN PETERSSON.

Witnesses:
CARL FRIBERG,
EWALD DELMAR.